(12) United States Patent
Kogo

(10) Patent No.: US 12,265,927 B2
(45) Date of Patent: Apr. 1, 2025

(54) CHARGING AUTHENTICATION SYSTEM, CHARGING CONTROL DEVICE, AND CHARGING AUTHENTICATION METHOD

(71) Applicant: YAZAKI CORPORATION, Tokyo (JP)

(72) Inventor: Kosuke Kogo, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 83 days.

(21) Appl. No.: 17/866,974

(22) Filed: Jul. 18, 2022

(65) Prior Publication Data
US 2022/0351261 A1 Nov. 3, 2022

Related U.S. Application Data

(63) Continuation of application No. PCT/JP2021/002922, filed on Jan. 27, 2021.

(30) Foreign Application Priority Data

Feb. 28, 2020 (JP) ................................ 2020-034114

(51) Int. Cl.
*G06Q 10/02* (2012.01)
*G06Q 30/0283* (2023.01)
*G06Q 50/06* (2012.01)

(52) U.S. Cl.
CPC ......... *G06Q 10/02* (2013.01); *G06Q 30/0283* (2013.01); *G06Q 50/06* (2013.01)

(58) Field of Classification Search
CPC ........................... G06Q 30/0283; G06Q 50/06
See application file for complete search history.

(56) References Cited

U.S. PATENT DOCUMENTS

| 9,348,381 | B2 | 5/2016 | Khoo et al. |
| 9,908,506 | B2 | 3/2018 | Taylor et al. |
| 10,960,782 | B2* | 3/2021 | Goei ..................... B60L 53/665 |
| 2011/0193522 | A1 | 8/2011 | Uesugi |
| 2011/0241824 | A1 | 10/2011 | Uesugi |
| 2014/0055091 | A1* | 2/2014 | Kondo .................... B60L 53/65 320/109 |

(Continued)

FOREIGN PATENT DOCUMENTS

JP 2002-369315 A 12/2002
JP 2009084813 A * 4/2009

(Continued)

OTHER PUBLICATIONS

Huang, Xiaohong, et al. "LNSC: A security model for electric vehicle and charging pile management based on blockchain ecosystem." IEEE access 6 (2018): 13565-13574. (Year: 2018).*

*Primary Examiner* — Emmett K. Walsh
(74) *Attorney, Agent, or Firm* — Sughrue Mion, PLLC

(57) ABSTRACT

A communication terminal owned by a user who desires to use a charging device for an electric vehicle transmits a charging start command for the charging device. The communication terminal transmits the charging start command and an authentication key to a charging control device. When the authentication key is received, the charging control device attached to an outlet of the charging device authenticates the communication terminal, and when the authentication succeeds, the charging control device controls the charging device to start charging.

10 Claims, 11 Drawing Sheets

(56) References Cited

U.S. PATENT DOCUMENTS

2016/0225104 A1* 8/2016 Yamaguchi ............ B60L 53/665
2020/0286077 A1* 9/2020 Berman ................ G06Q 20/327
2020/0380429 A1* 12/2020 Kawamoto .......... G06Q 10/083

FOREIGN PATENT DOCUMENTS

| JP | 2013-198230 A | 9/2013 |
| JP | 2015-146162 A | 8/2015 |
| JP | 2019-103255 A | 6/2019 |

* cited by examiner

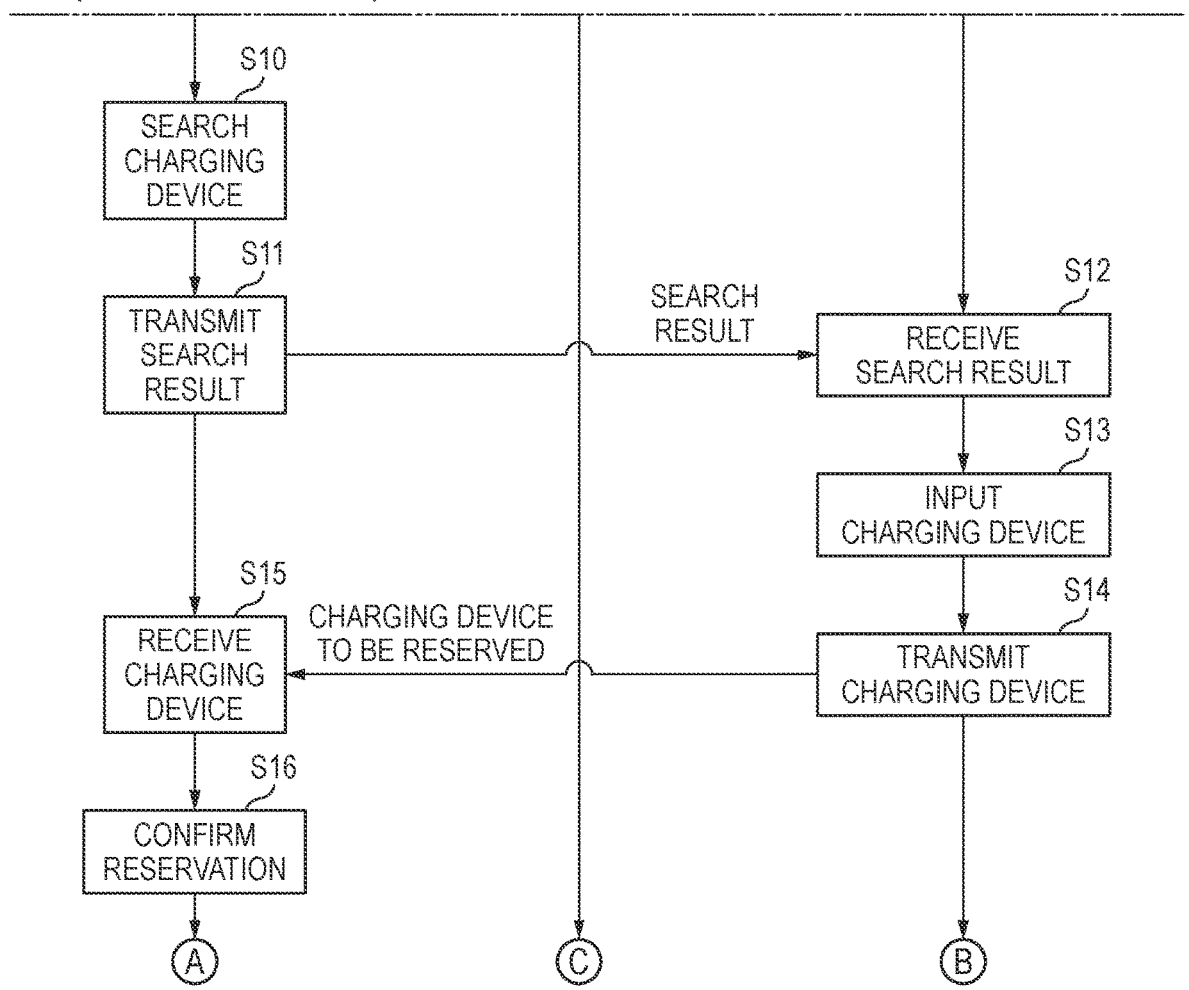

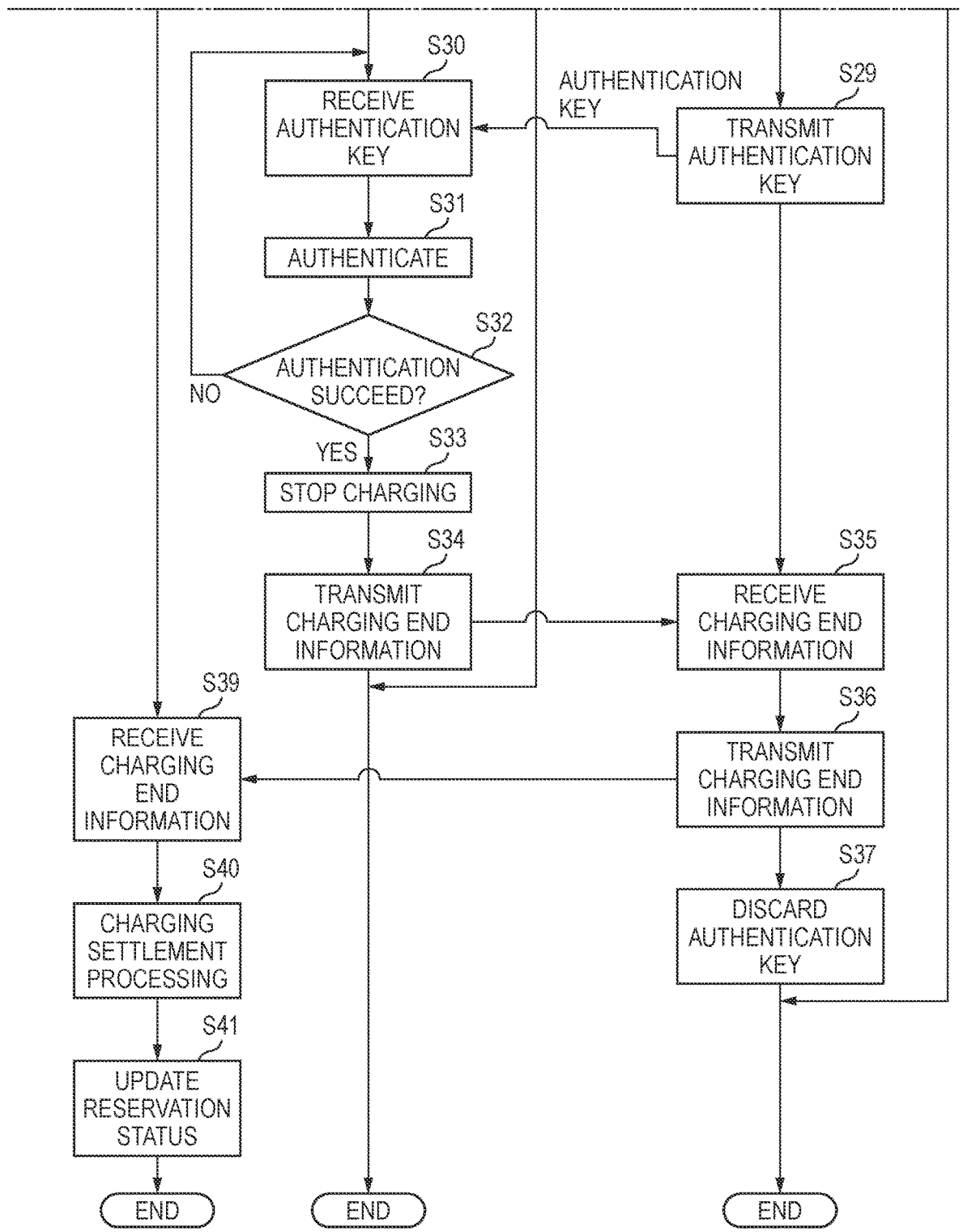
(FIG. 6 CONTINUED)

*FIG. 7*

USER INFORMATION REGISTRATION

TERMS OF USE

BASIC INFORMATION

| USER NAME: REQUIRED |

| VEHICLE TYPE: REQUIRED |

| TELEPHONE NUMBER: REQUIRED |

| E-mail: REQUIRED |

| PROFILE IMAGE SELECTION |

REGISTRATION OF SETTLEMENT METHOD

| CREDIT CARD NUMBER: REQUIRED |

| CREDIT CARD EXPIRATION DATE: REQUIRED |

| TO SELECT USE PLAN |

Sc1

CHARGING AUTHENTICATION SYSTEM, CHARGING CONTROL DEVICE, AND CHARGING AUTHENTICATION METHOD

CROSS REFERENCE TO RELATED APPLICATIONS

This application is a continuation of PCT application No. PCT/JP2021/002922, which was filed on Jan. 27, 2021 based on Japanese patent application 2020-034114 filed on Feb. 28, 2020, whose contents are incorporated herein by reference. Also, all the references cited herein are incorporated as a whole.

BACKGROUND OF THE INVENTION

Technical Field

The present invention relates to a charging authentication system, a charging control device, and a charging authentication method to use a charging device that charges a battery mounted on an electric vehicle.

Background Art

Examples of an electric vehicle on which a battery is mounted include an electrically powered vehicle, a hybrid vehicle, an electric bicycle, and an electric wheelchair. One of problems with widespread use of the electric vehicle (in particular, the electrically powered vehicle) is a concern that, when the number of charging stations does not increase so as to cover an entire country, charging cannot be performed when the battery runs out at an outing destination.

Therefore, it is considered to permit others to use a charging device installed in a private house or company while an owner does not use the charging device. However, in this case, a user who wants to use the charging device may erroneously use a charging device that is not permitted for use.

In addition, it is also considered that authentication is performed by operating an operation unit provided in a charging device (Patent Literature 1), but it is not suitable for permitting use by others.

CITATION LIST

Patent Literature

Patent Literature 1: JP-A-2019-103255

SUMMARY

The present invention has been made in view of the above circumstances, and an object of the present invention is to provide a charging authentication system, a charging control device, and a charging authentication method capable of preventing a user from erroneously using a charging device that is not permitted for use.

Solution to Problem

According to an embodiment, a charge authentication system includes:
a user terminal owned by a user who desires to use a charging device for an electric vehicle and configured to transmit a charging start command for the charging device;
an authentication unit configured to authenticate the user terminal that transmits the charging start command; and
a charging control device connected to the charging device and configured to control the charging device to start charging when authentication by the authentication unit succeeds.

A charging control device (3) including:
a plug (31) that is insertable into an outlet provided in a charging device (2) for an electric vehicle (8);
an outlet (32) that outputs charging power of the charging device (2) supplied from the plug (31); and
a charging control unit configured to perform wireless communication with a user terminal (5) owned by a user (4) who desires to use the charging device (2), and to output the charging power from the outlet (32) when authentication of the user terminal (5) succeeds.

According to an embodiment, a charging authentication method includes:
a step of transmitting, by a user terminal (5) owned by a user (4) who desires to use a charging device (2) for an electric vehicle (8), a charging start command for the charging device (2);
a step of authenticating, by an authentication unit, the user terminal (5) that transmits the charging start command; and
a step of controlling, by a charging control device (3) connected to the charging device (2), the charging device (2) to start charging when authentication by the authentication unit succeeds.

According to an embodiment, a charging authentication method includes:
a step of distributing, to an owner of a charging device (2), a charging control device (3) that is detachably attached to the charging device (2) and that controls the charging device (2) to start charging only when authentication of a user (4) succeeds; and
a step of transmitting, by a user terminal (5) owned by the user (4) who desires to use the charging device (2), a charging start command for the charging device (2).

BRIEF DESCRIPTION OF THE DRAWINGS

FIG. 7 is an example of a registration screen displayed on the communication terminal shown in FIG. 1.

DETAILED DESCRIPTION OF EMBODIMENTS

A specific embodiment related to the present invention will be described below with reference to the drawings.

A charging authentication system 1 according to the present embodiment is a system that can search for a charging device installed in a private house, company, or the like and reserve the charging device. In the present embodiment, an electrically powered vehicle will be described as an example of an electric vehicle, but the electric vehicle may be a vehicle that travels using a battery as a drive source, and may be a hybrid vehicle, an electric bicycle, an electric motorcycle, or the like.

Figure 1:
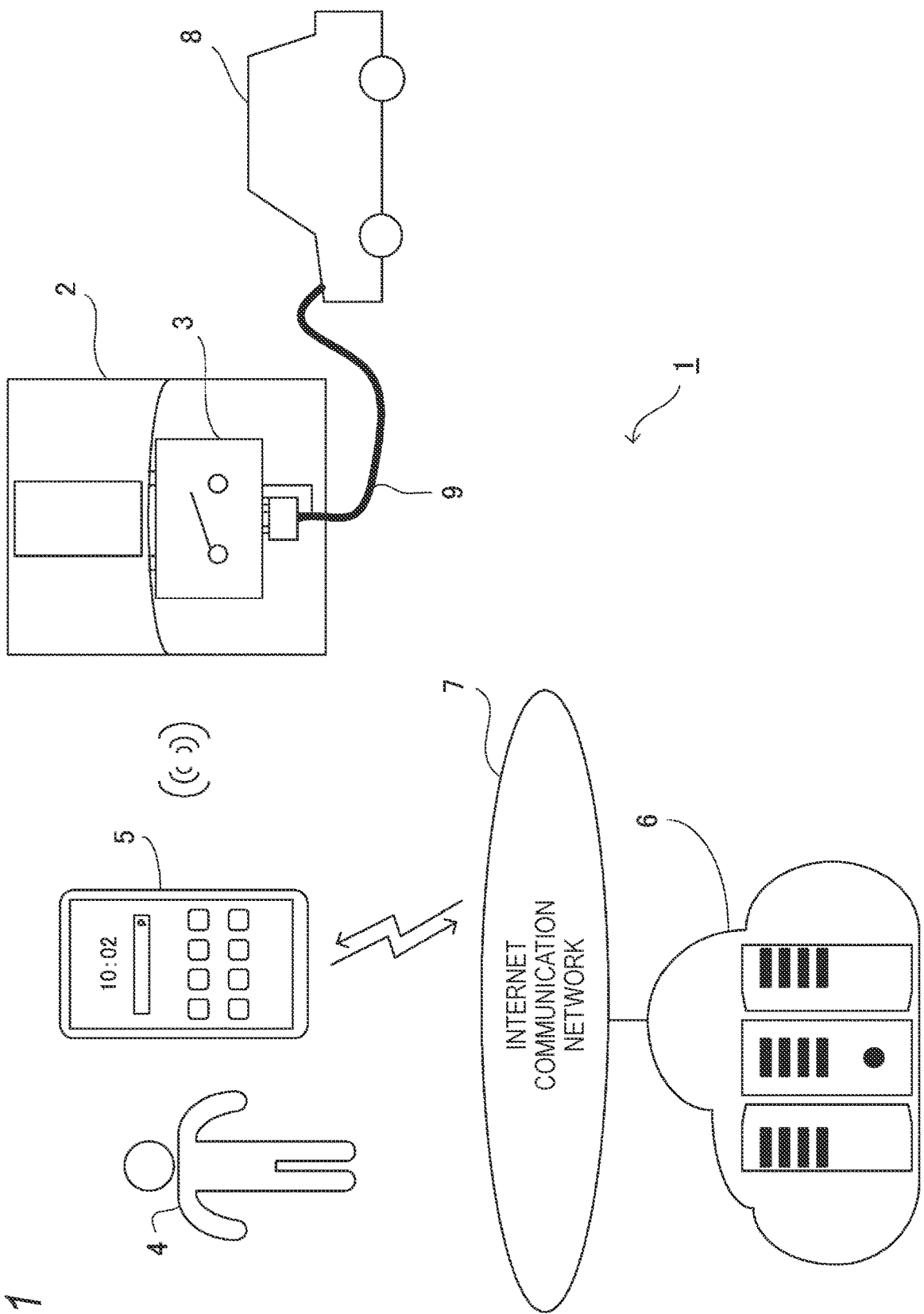
FIG. 1 is a block diagram showing an embodiment of a charging authentication system in which a charging authentication method according to the present embodiment is implemented.

As shown in FIG. 1, the charging authentication system 1 includes a plurality of charging devices 2, a charging control device 3 detachably attached to the charging device 2, a communication terminal 5 (user terminal) owned by a user 4 who desires to use the charging devices 2, and a server 6 that executes search, reservation, and the like of the charging devices 2 by communication with the communication terminal 5. In the present embodiment, the communication terminal 5 and the server 6 are configured to be able to communicate with each other via Internet communication network 7. In addition, the communication terminal 5 and the charging control device 3 are configured to be able to wirelessly communicate with each other using, for example, Bluetooth (BT (registered trademark)) communication, which is one of wireless communication standards that do not require a line usage fee.

The charging device 2 is installed in a detached house, a store, or the like all over the country, and has an outlet (not shown) for charging the electric vehicle. Normally, the electric vehicle can be charged by inserting a plug of a charging cable 9 connected to the electric vehicle into the outlet.

Figure 2:
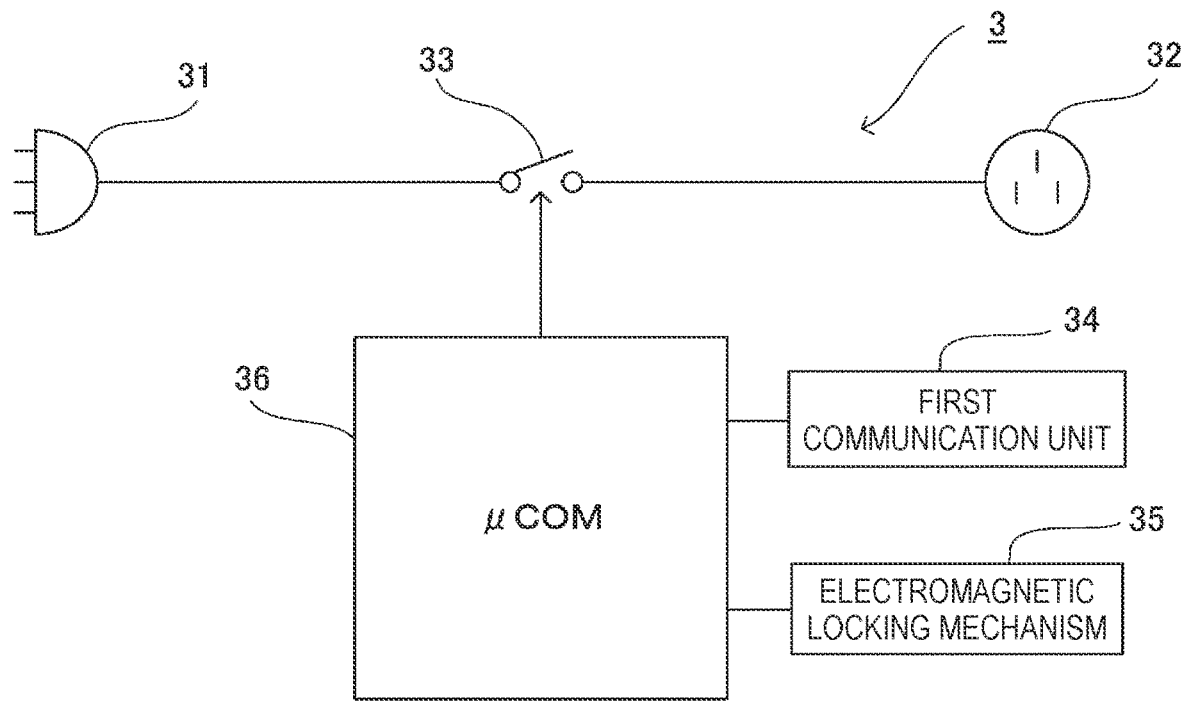
FIG. 2 is a block diagram showing details of a charging control device shown in FIG. 1.

The charging control device 3 is a device that is insertable (detachable) into the outlet of the charging device 2 and controls charging of the charging device 2. As shown in FIG. 2, the charging control device 3 includes a plug 31, an outlet 32, a switch 33, a first communication unit 34, an electromagnetic locking mechanism 35 (locking mechanism), a microcomputer (hereinafter, referred to as μCOM) 36, and a housing (not shown) that houses these components.

The plug 31 is insertable into the outlet provided in the charging device 2, and is provided on one surface of the housing. Charging power of the charging device 2 supplied from the plug 31 is output to the outlet 32. The outlet 32 is provided on a surface opposite to the one surface of the housing on which the plug 31 is provided. The switch 33 is provided between the plug 31 and the outlet 32, and when the switch 33 is turned on, the charging power is output from the outlet 32, and when the switch 33 is turned off, the charging power output from the outlet 32 is cut off.

The first communication unit 34 is a communication unit to perform BT communication with the communication terminal 5. The electromagnetic locking mechanism 35 electromagnetically locks the charging cable 9 connected to the outlet 32, and lock and unlock is controlled by the μCOM 36 described later. The μCOM 36 is an understood microcomputer including a CPU, a ROM, and a RAM, and controls the entire charging control device 3. In the ROM of the μCOM 36, an authentication key of the charging control device 3 is stored in advance. The μCOM 36 performs authentication using the authentication key received from the communication terminal 5 and the authentication key stored in the ROM, and when the authentication succeeds, the switch 33 is turned on to start charging.

Figure 3:
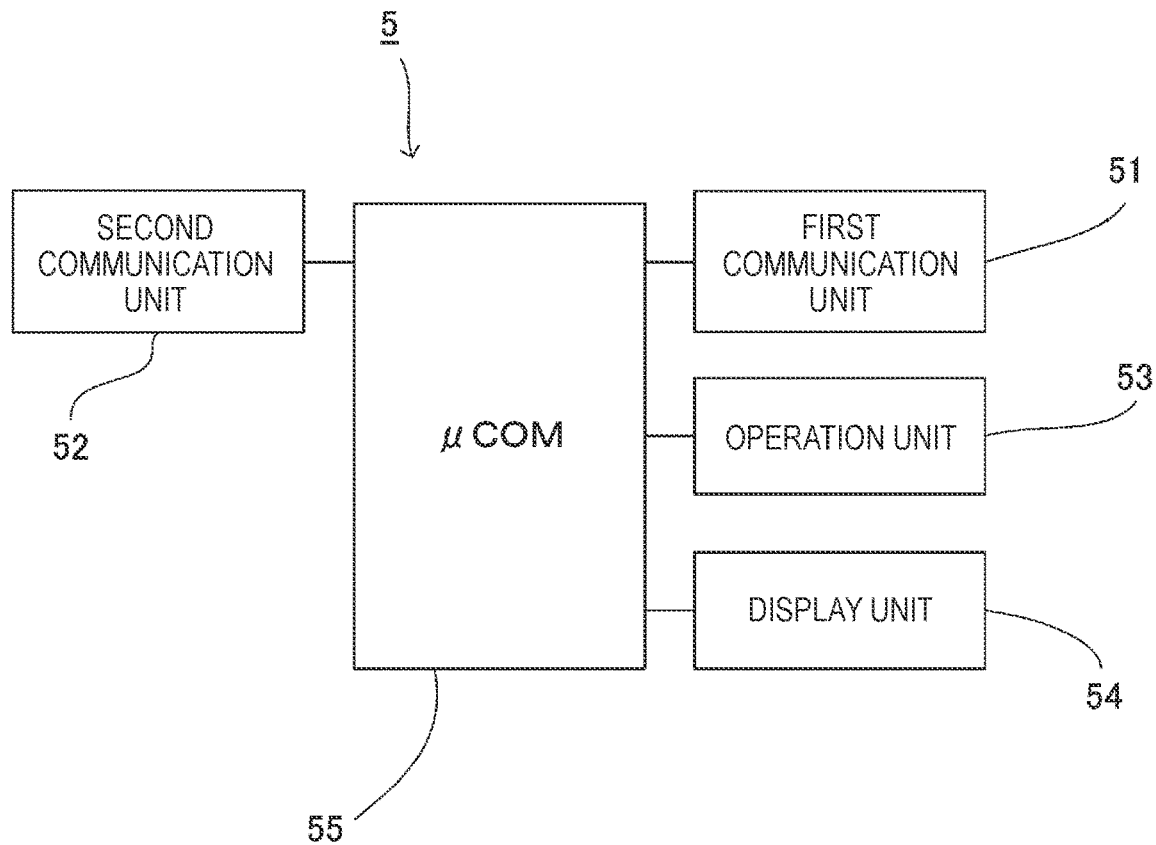
FIG. 3 is a block diagram showing details of a communication terminal shown in FIG. 1.

The communication terminal 5 includes, for example, a tablet, a smartphone, or the like. As shown in FIG. 3, the communication terminal 5 includes a first communication unit 51, a second communication unit 52, an operation unit 53, a display unit 54, and a μCOM 55. The first communication unit 51 is a communication unit to perform BT communication with the charging control device 3. The second communication unit 52 is a communication unit to connect to the Internet communication network 7. The operation unit 53 performs various operations for using the charging authentication system 1. Information transmitted from the server 6 is displayed on the display unit 54. The μCOM 55 controls the entire communication terminal 5.

In the present embodiment, as an example of the operation unit 53 and the display unit 54, a touch panel on which the operation unit 53 and the display unit 54 are integrally formed will be described. A charging authentication application distributed by an operating company operating the charging authentication system 1 is downloaded and stored in the communication terminal 5. When the charging authentication application is launched, the μCOM 55 communicates with the server 6 via the Internet communication network 7, and can reserve the charging device 2. After receiving the authentication key of the charging control device 3 attached to the reserved charging device 2 from the server 6, the μCOM 55 communicates with the charging control device 3 using BT communication, and transmits the authentication key to the charging control device 3 so that the reserved charging device 2 can be used.

Figure 4:
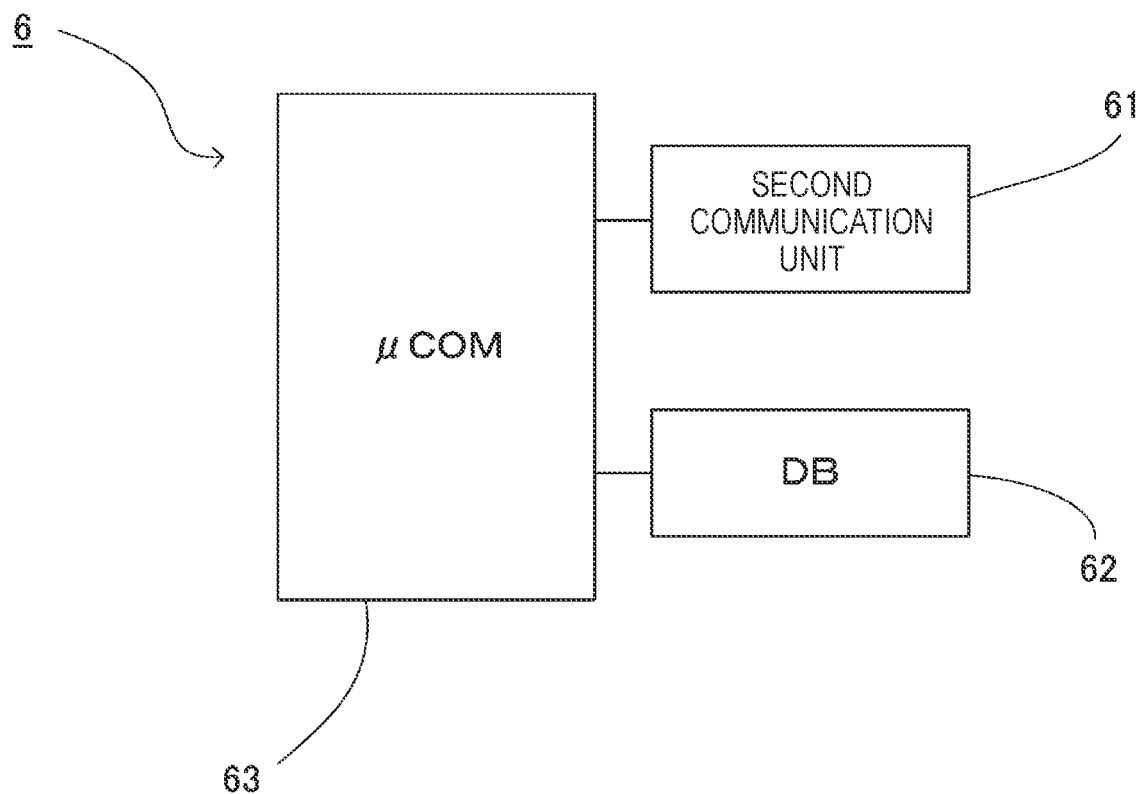
FIG. 4 is a block diagram showing details of a server shown in FIG. 1.

As shown in FIG. 4, the server 6 includes a second communication unit 61, a DB 62, and a μCOM 63. The second communication unit 61 is a communication unit to connect to the Internet communication network 7. The DB 62 stores the authentication key of the charging device 2 attached to the distributed charging control device 3, registration information (installation location, use condition, surrounding information, and the like) and a reservation status of the charging device 2 to which the charging control device 3 is attached, and registration information (name, vehicle type, contact information, payment information, and the like) of the user 4. The μCOM 63 controls the entire server 6, searches the DB 62 for the charging device 2 in response to input from the communication terminal 5, and transmits a search result to the communication terminal 5. The μCOM 63 confirms reservation of the charging device 2 in response to the input from the communication terminal 5, and transmits the authentication key of the charging control device 3 attached to the charging device 2 to the communication terminal 5 so that a confirmed charging device 2 can be used.

Figure 5:
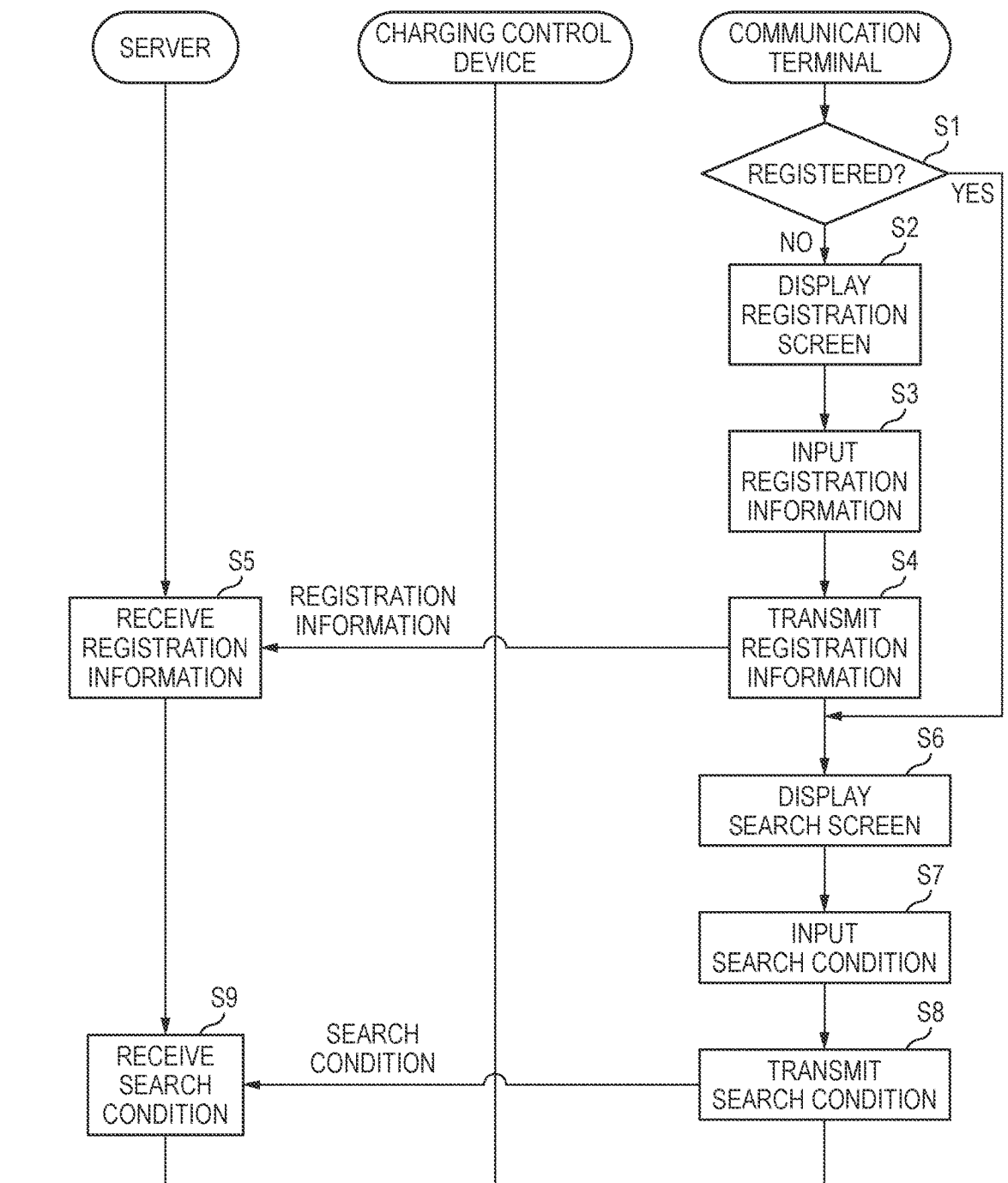
FIG. 5 is a flowchart showing a processing procedure of the server, the charging control device, and the communication terminal shown in FIG. 1.
Figure 6:
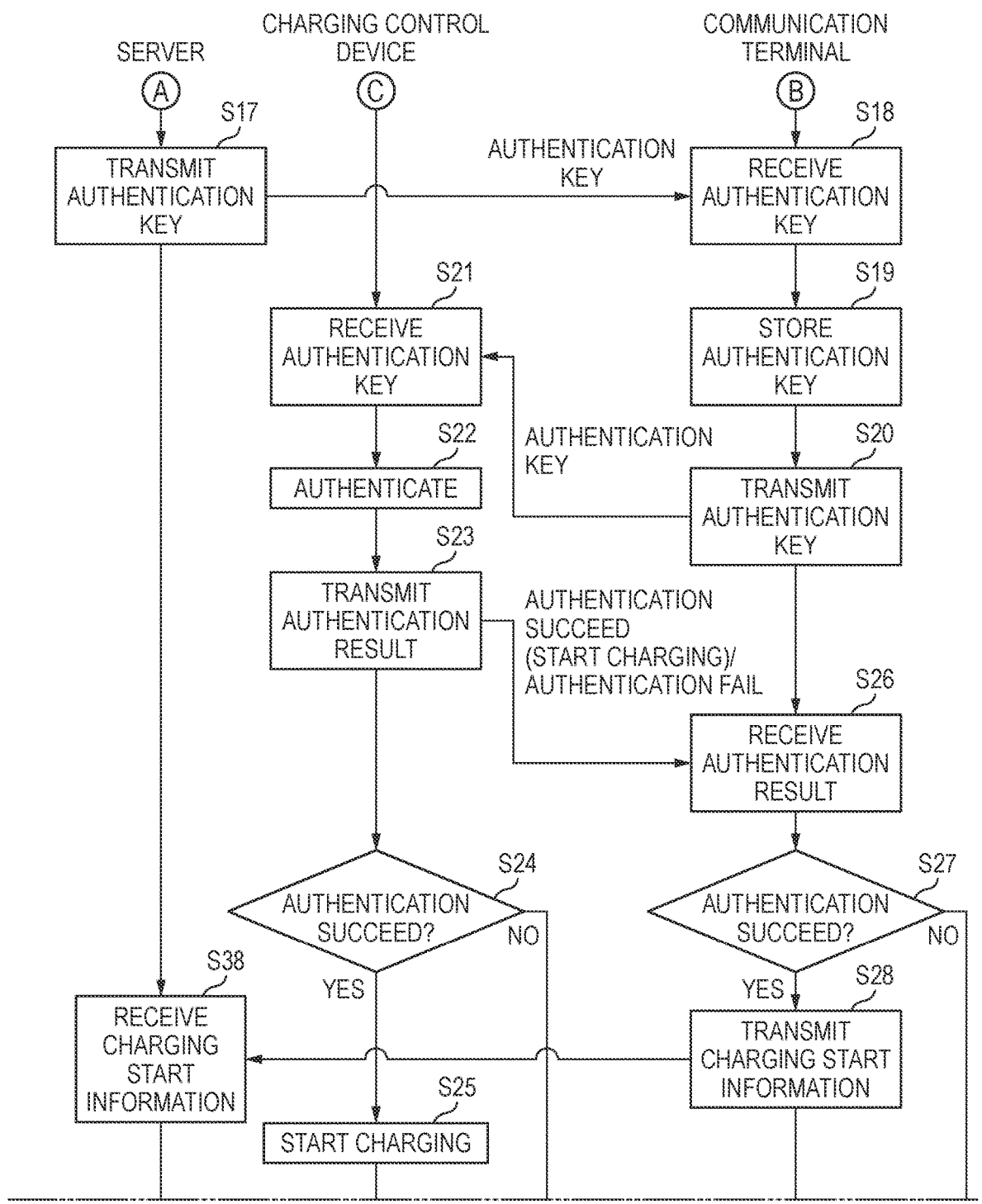
FIG. 6 is a flowchart showing a processing procedure of the server, the charging control device, and the communication terminal shown in FIG. 1.

Next, an operation of the charging authentication system 1 having the above-described configuration will be described with reference to FIGS. 5 and 6. The user 4 operates the communication terminal 5 in order to reserve the charging device 2 using the charging authentication system 1 to launch the charging authentication application.

Figure 8:
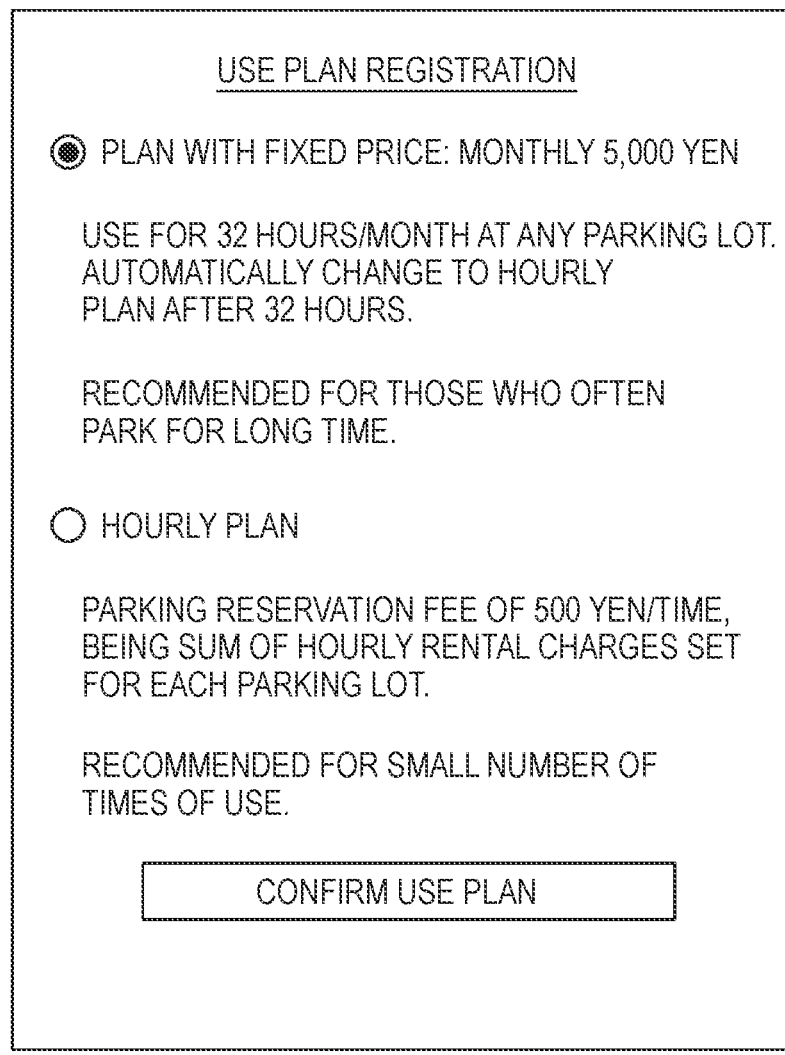
FIG. 8 is an example of a registration screen displayed on the communication terminal shown in FIG. 1.

In response to this, the μCOM 55 of the communication terminal 5 (hereinafter, abbreviated as the "communication terminal 5") executes the charging authentication application. When the communication terminal 5 executes the charging authentication application, the communication terminal 5 determines whether the user 4 is registered in the charging authentication application (S1). If the user 4 is registered (Yin S1), the communication terminal 5 immediately proceeds to S6. If the user 4 is not registered (N in S1), the communication terminal 5 displays a registration screen Sc1 as shown in FIG. 7 on the display unit 54 (S2). When the user 4 touches "to select use plan" on the registration screen Sc1, the communication terminal 5 displays a use plan registration screen Sc2 shown in FIG. 8.

When the user 4 inputs registration information (user name, vehicle type, telephone number, E-mail, credit card number, credit card expiration date, use plan) on the registration screen Sc1 and the use plan registration screen Sc2 (S3), the communication terminal 5 transmits the registration information to the server 6 (S4), and then proceeds to S6. The server 6 receives the registration information and stores the registration information in the DB 62 (S5).

Figure 9:
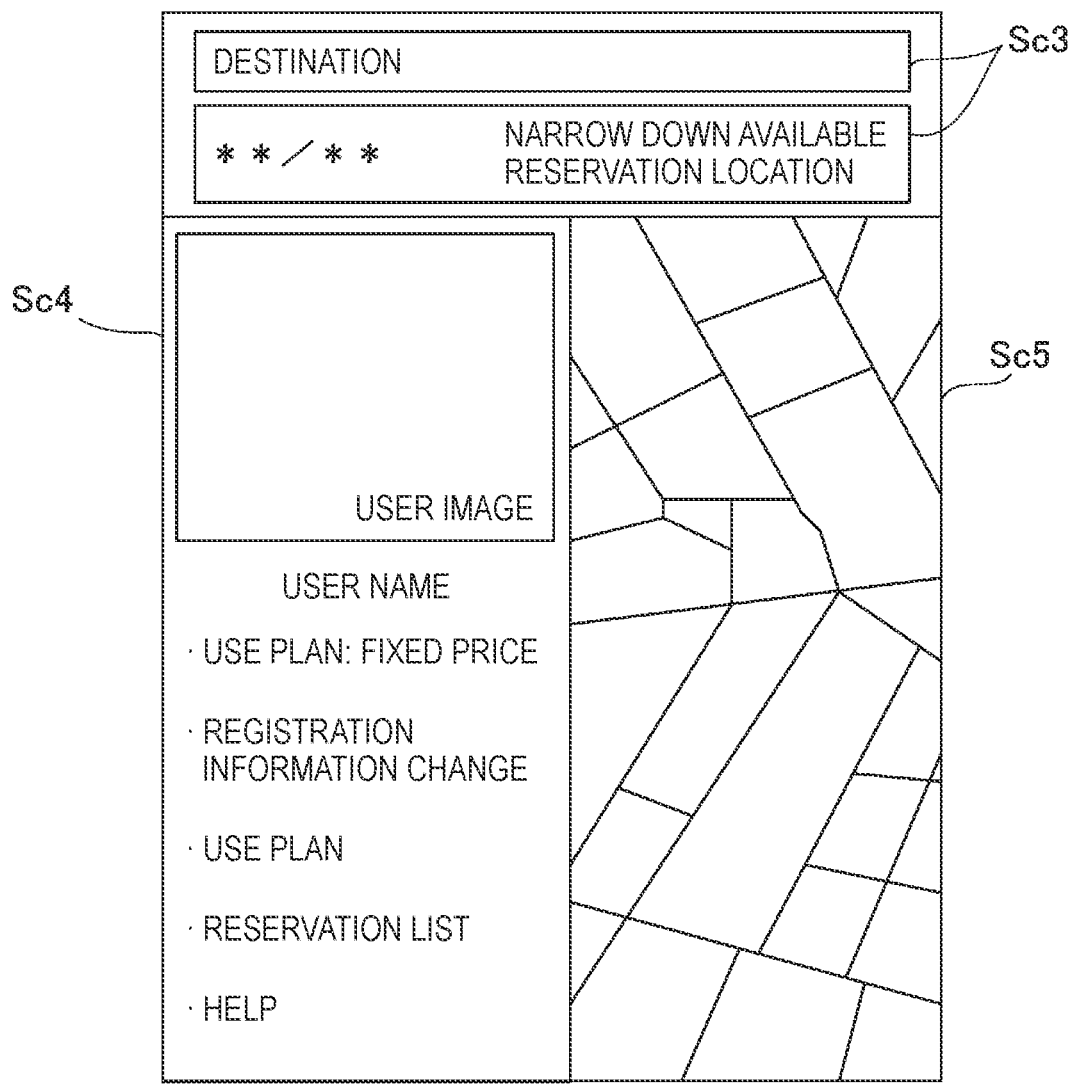
FIG. 9 is an example of a search screen, a menu screen, and a search result screen displayed on the communication terminal shown in FIG. 1.

In S6, the communication terminal 5 displays a search screen Sc3 as shown in FIG. 9 on the display unit 54. In an example shown in FIG. 9, the search screen Sc3 for inputting narrowing-down conditions such as a destination, a date of use, and a time period of use as search conditions is displayed. A menu screen Sc4 is displayed at a lower left of the search screen Sc3, and a search result screen Sc5 is displayed at a lower right of the search screen Sc3. On the menu screen Sc4, a registration image of the user, a user name, and a use plan are displayed, and touch buttons for switching to a registration information change screen, a use plan change screen, a reservation list screen, and a help screen are displayed. On the search screen Sc3, a map of a surrounding is displayed before the search condition is input. When the user 4 swipes the search screen Sc3, the communication terminal 5 erases the menu screen Sc4 and enlarges the search screen Sc3 as shown in FIG. 10.

When the user 4 inputs the search condition on the search screen Sc3 (S7), the communication terminal 5 transmits the search condition to the server 6 (S8). When the server 6 receives the search condition (S9), the server 6 searches the charging devices 2 registered in the DB 62 for the charging device 2 that matches the search condition (S10). Thereafter, the server 6 transmits the search result to the communication terminal 5 (S11). When the communication terminal 5 receives the search result (S12), the communication terminal 5 displays the search result on the search screen Sc3.

Figure 10:
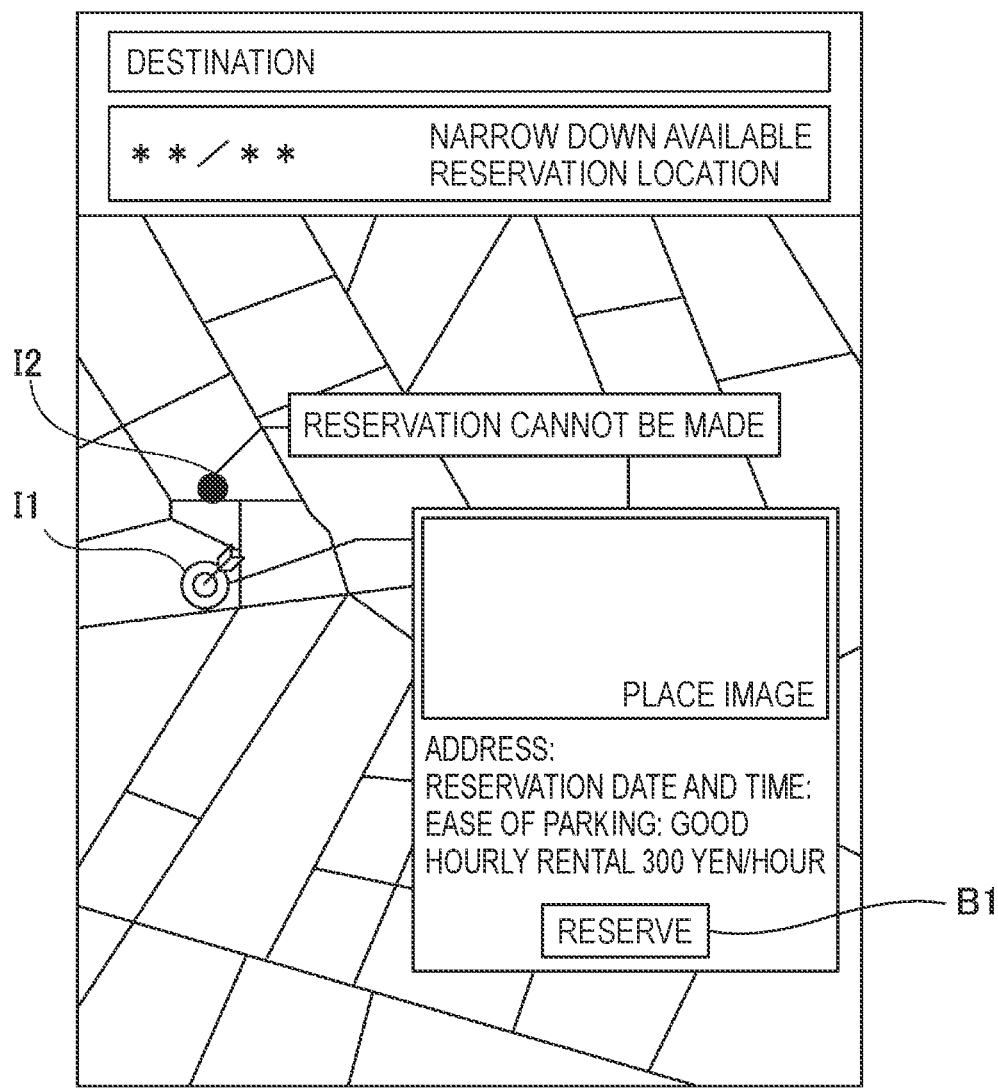
FIG. 10 is an example of the search screen and the search result screen displayed on the communication terminal shown in FIG. 1.

As a display example of the search result, as shown in FIG. 10, it is considered to display an icon I1 indicating an available charging device and an icon 12 indicating an unavailable charging device among the charging devices 2 searched for on the map. When the user 4 touches the icon 12, there is a display that reservation cannot be made. When the user 4 touches the icon I1, an image of a place where the charging device 2 is installed, an address, a reservation date and time (date of use, time period of use), ease of parking, a fee, and a reserve button B1 are displayed.

When the user 4 touches the icon I1 of the available charging device 2 to be reserved and touches the reserve button B1, the charging device 2 corresponding to the touched icon I1 is input to the communication terminal 5 as the charging device 2 to be reserved (S13). When the charging device 2 is input (S13), the communication terminal 5 transmits the charging device 2 to be reserved to the server 6 (S14).

When the server 6 receives the charging device 2 to be reserved (S15), the server 6 confirms the reservation of the charging device 2 received in the date of use and the time period of use included in the search condition (S16), and updates the reservation status of each charging device 2 (that is, makes the time period of use of the charging device 2 for which the reservation is confirmed non-reservable). Thereafter, the server 6 transmits the authentication key of the charging device 2 for which the reservation is confirmed to the communication terminal 5 (S17). When the communication terminal 5 receives the authentication key (S18), the communication terminal 5 stores the authentication key (S19).

Thereafter, the user 4 goes to a place of the charging device 2 on the date of use and the time period of use reserved by the electric vehicle 8. The user 4 inserts one end of the owned charging cable 9 into the outlet 32 of the charging control device 3, and inserts the other end into an outlet provided in the electric vehicle 8. That is, the charging device 2 and the electric vehicle 8 are connected using the charging cable 9. Next, the user 4 operates the communication terminal 5 to launch the charging authentication application again, and transmits a charging start command and the stored authentication key to the charging control device 3 by BT communication (S20). When the μCOM 36 of the charging control device 3 (hereinafter abbreviated as "charging control device 3") receives the charging start command and the authentication key from the communication terminal 5 (S21), the μCOM 36 compares the received authentication key with an authentication key stored in the μCOM 36 to perform authentication (S22).

Thereafter, the charging control device 3 transmits an authentication result to the communication terminal 5 (step S23), and if the authentication result fails (N in S24), the charging control device 3 immediately ends a processing, and if the authentication result succeeds (Y in S24), the charging control device 3 turns on the switch 33 to start charging and functions as a lock control unit to control the electromagnetic locking mechanism 35 to lock the charging cable 9 (S25). On the other hand, the communication terminal 5 receives the authentication result (S26), and if the authentication result succeeds (Yin S27), the communication terminal 5 transmits charging start information to the server 6 (S28). Since the charging control device 3 starts charging when the authentication succeeds, the authentication result indicating success of the authentication described above can also be referred to as the charging start information. That is, in the present embodiment, the charging start information transmitted from the charging control device 3 is transmitted to the server 6 via the communication terminal 5.

Thereafter, when the user 4 leaves the electric vehicle 8 and finishes work in a surrounding and then returns, the user 4 launches the charging authentication application on the communication terminal 5 and performs a charging end operation. Accordingly, the communication terminal 5 transmits a charging end command and the authentication key to the charging control device 3 (S29). When the charging control device 3 receives the charging end command and the authentication key from the communication terminal 5 (S30), the charging control device 3 compares the received authentication key with an authentication key stored in the charging control device 3 to perform authentication (S31). When the authentication fails (N in S32), the charging control device 3 returns to S30. When the authentication succeeds (Yin S32), the charging control device 3 turns off the switch 33 to stop charging and functions as the lock control unit to control the electromagnetic locking mechanism 35 to release the lock of the charging cable 9 (S33). Thereafter, the charging control device 3 transmits charging end information to the communication terminal 5 (S34), and ends a processing.

When the communication terminal 5 receives the charging end information from the charging control device 3 (S35), the communication terminal 5 transmits the charging end information to the server 6 (S36). Thereafter, the communication terminal 5 discards the authentication key (S37), and ends a processing.

When the server 6 receives the charging start information and the charging end information (S38, S39), the server 6 calculates a fee corresponding to a charging time obtained from the received charging start information and charging end information, and performs a charging settlement processing of charging (S40). In addition, the server 6 obtains vacancy information of the charging device 2 from the charging start information and the charging end information, updates the reservation status based on the vacancy information (step S41), and then ends a processing.

According to the above-described embodiment, the charging control device 3 starts charging by the charging device 2 when the authentication of the communication terminal 5 succeeds, so that it is possible to prevent the user 4 from erroneously using the charging device 2 that is not permitted for use.

In addition, according to the above-described embodiment, the communication terminal 5 transmits the charging end command for the charging device 2, and the charging control device 3 controls the charging device 2 to end the charging when the charging end command is transmitted from the communication terminal 5. Accordingly, the charging can be ended at a timing when the user wants to end the charging.

In addition, according to the above-described embodiment, the charging control device 3 controls the electromagnetic locking mechanism 35 to lock the charging cable 9 at the start of charging, and to release the lock of the charging cable 9 at the end of charging. Accordingly, it is possible to prevent the charging cable 9 from being stolen while the user is away from the charging device 2 during charging.

In addition, according to the above-described embodiment, the server 6 can charging a fee according to the charging time obtained based on the charging start information and the charging end information. In addition, according to the above-described embodiment, in order to stop charging of the server 6, it is necessary to operate the communication terminal 5 to transmit the charging end command to the charging control device 3. In an actual operation, it is assumed that after the user 4 finishes the charging, the charging cable 9 is pulled out immediately and the charging is finished. Therefore, in the present embodiment, the charging control device 3 maintains electromagnetic lock by the electromagnetic locking mechanism 35 until the charging end command is transmitted, so that the user 4 cannot retrieve the charging cable 9. Accordingly, the user 4 always operates the communication terminal 5 to prompt an end of charging, and the charging of the server 6 can be stopped.

In addition, according to the above-described embodiment, the server 6 can grasp vacancy situation of the charging device 2 from the charging start information and the charging end information.

In addition, according to the above-described embodiment, since the charging control device 3 is detachably attached to the charging device 2, an authentication function of the charging device 2 can be easily provided only by attaching the charging control device 3 to the charging device 2.

In addition, according to the above-described embodiment, the charging start information and the charging end information transmitted from the charging control device 3 is transmitted to the server 6 via the communication terminal 5. Accordingly, the charging control device 3 only needs to be able to perform BT communication without using the line usage fee, and does not need to perform the communication via the Internet communication network 7 that requires the line usage fee. Therefore, cost of an owner of the charging device 2 can be reduced, and the charging device 2 can be more easily provided.

The present invention is not limited to the above-described embodiment, and modifications, improvements, and the like can be made as appropriate. In addition, a material, shape, size, number, arrangement position, and the like of each component in the above embodiment are optional and are not limited as long as the present invention can be achieved.

According to the above-described embodiment, the charging control device 3 can directly communicate with only the communication terminal 5, and transmits the charging start information and the charging end information to the server 6 via the communication terminal 5, but the present invention is not limited thereto. The charging control device 3 and the server 6 may communicate with each other via the Internet communication network 7 so that the charging control device 3 can directly transmit the charging start information and the charging end information to the server 6.

According to the above-described embodiment, the charging control device 3 is caused to perform authentication, but the present invention is not limited thereto. The authentication may be performed by the communication terminal 5 or the server 6. For example, when the authentication is performed by the communication terminal 5, it is considered that the charging control device 3 transmits the authentication key of the charging control device 3 to the communication terminal 5, and the communication terminal 5 compares the authentication key transmitted from the charging control device 3 with the authentication key transmitted from the server 6 in advance to perform authentication. In addition, when the server 6 performs the authentication, for example, it is considered that the charging control device 3 and the communication terminal 5 transmit their own identification information to the server 6, and the server 6 performs the authentication based on the reservation status.

In addition, according to the above-described embodiment, the charging control device 3 is distributed to the owner of the charging device 2, but the present invention is not limited thereto. The charging control device 3 may be distributed to the user 4 who uses the charging device 2.

In addition, according to the above-described embodiment, the electromagnetic locking mechanism 35 is provided in the charging control device 3, but the present invention is not limited thereto. The electromagnetic locking mechanism 35 is not an essential component, and may be omitted.

In addition, according to the above-described embodiment, the server 6 calculates the fee based on the charging time and charges the fee, but the present invention is not limited thereto. The server 6 may calculate a fee based on an amount of charging and charge the fee.

In addition, according to the above-described embodiment, the charging control device 3 is detachably attached to the charging device 2 and is retrofitted to the charging device 2, but the present invention is not limited thereto. The charging control device may be incorporated in the charging device 2 in advance.

In addition, an operation of the server 6 is not limited to the above-described embodiment, and when the user 4 reserves the charging device 2, when the user 4 starts charging by the charging device 2, when the user 4 ends charging by the charging device 2, or the like, the fact may be automatically distributed by a medium such as an e-mail. Accordingly, the owner can also check a usage status of the charging device 2 one by one.

Here, characteristics of the embodiment of the charging authentication system, the charging control device, and the charging authentication method according to the present invention described above are briefly summarized and listed in the following [1] to [10].

[1] A charging authentication system (1) including:
- a user terminal (5) owned by a user (4) who desires to use a charging device (2) for an electric vehicle (8) and configured to transmit a charging start command for the charging device (2);
- an authentication unit (36) configured to authenticate the user terminal (5) that transmits the charging start command; and
- a charging control device (3) connected to the charging device (2) and configured to control the charging device (2) to start charging when authentication by the authentication unit (36) succeeds.

[2] In the charging authentication system (1) according to [1],
- the user terminal (5) may transmit a charging end command for the charging device (2), and
- when the charging end command is transmitted from the user terminal (5), the charging control device (3) may control the charging device (2) to end charging.

[3] In the charging authentication system (1) according to [2],
- the charging control device (3) may include an outlet (32) into which a charging cable (9) is inserted, a locking mechanism (35) that locks the charging cable (9) inserted into the outlet (32), and a lock control unit (36) that controls the locking mechanism (35) to lock the charging cable (9) at the start of charging and to release the lock of the charging cable (9) at the end of charging.

[4] In the charging authentication system (1) according to [2],
- the charging control device (3) may transmit charging start information at the start of charging and transmits charging end information at the end of charging, and
- a server (6) may further be included that calculates a fee according to a charging time obtained from the charging start information and the charging end information transmitted from the charging control device (3), and charges the fee.

[5] In the charging authentication system (1) according to [4],
- the server (6) may obtain vacancy information of the charging device (2) based on the charging end information and the charging start information, and provides the vacancy information of the charging device (2) to the user terminal (5).

[6] In the charging authentication system (1) according to [1],
- the charging control device (3) may be detachably attached to the charging device (2).

[7] A charging control device (3) including:
- a plug (31) that is insertable into an outlet provided in a charging device (2) for an electric vehicle (8);
- an outlet (32) that outputs charging power of the charging device (2) supplied from the plug (31); and
- a charging control unit (36) configured to perform wireless communication with a user terminal (5) owned by a user (4) who desires to use the charging device (2), and to output the charging power from the outlet (32) when authentication of the user terminal (5) succeeds.

[8] A charging authentication method including:
- a step of transmitting, by a user terminal (5) owned by a user (4) who desires to use a charging device (2) for an electric vehicle (8), a charging start command for the charging device (2);
- a step of authenticating, by an authentication unit (36), the user terminal (5) that transmits the charging start command; and
- a step of controlling, by a charging control device (3) connected to the charging device (2), the charging device (2) to start charging when authentication by the authentication unit (36) succeeds.

[9] The charging authentication method according to [8], may further includes:
- a step of connecting the charging device (2) and the electric vehicle (8) by the user (4) using a charging cable before the user terminal (5) transmits the charging start command.

[10] A charging authentication method including:
- a step of distributing, to an owner of a charging device (2), a charging control device (3) that is detachably attached to the charging device (2) and that controls the charging device (2) to start charging only when authentication of a user (4) succeeds; and
- a step of transmitting, by a user terminal (5) owned by the user (4) who desires to use the charging device (2), a charging start command for the charging device (2).

According to the charging authentication system and the charging authentication method having configurations of the above [1] and [8] to [10], the charging control device starts charging by the charging device when the authentication of the user terminal succeeds, so that it is possible to prevent the user from erroneously using a charging device that is not permitted for use.

According to the charging authentication system having a configuration of the above [2], the user terminal transmits the charging end command for the charging device, and the charging control device controls the charging device to end charging when the charging end command is transmitted from the user terminal. Accordingly, the charging can be ended at a timing when the user wants to end the charging.

According to the charging authentication system having a configuration of the above [3], the lock control unit controls the locking mechanism to lock the charging cable at the start of charging, and to release the lock of the charging cable at the end of charging. Accordingly, it is possible to prevent the charging cable from being stolen while the user is away from the charging device during charging.

According to the charging authentication system having a configuration of the above [4], the server can charge the fee according to the charging time obtained based on the charging start information and the charging end information.

According to the charging authentication system having a configuration of the above [5], the server can grasp vacancy situation of the charging device from the charging start information and the charging end information.

According to the charging authentication system and the charging control device having configurations of the above [6] and [7], since the charging control device is detachably attached to the charging device, an authentication function of the charging device can be easily provided only by attaching the charging control device to the charging device.

Although the present invention has been described in detail with reference to a specific embodiment, it will be apparent to those skilled in the art that various changes and modifications can be made without departing from the spirit and the scope of the present invention.

According to an embodiment, it is possible to provide a charging authentication system, a charging control device, and a charging authentication method capable of preventing a user from erroneously using a charging device that is not permitted for use. The embodiment that provides this effect is useful for the charging authentication system, the charging control device, and the charging authentication method.

What is claimed is:

1. A charging authentication system comprising:
   a user terminal owned by a user who desires to use a charging device for an electric vehicle and configured to transmit a charging start command for the charging device;
   an authentication unit, implemented by a processor, configured to authenticate the user terminal, that transmits the charging start command, based on an authentication key that is both provided to the user terminal in response to the user terminal reserving the charging device and is stored in advance of the user terminal reserving the charging device; and
   a charging control device connected to the charging device and configured to control the charging device to start charging when authentication by the authentication unit succeeds,
   wherein the charging authentication system further comprises a server configured to provide the authentication key to the user terminal,
   wherein the user terminal is configured to be instructed to discard the authentication key in response to an ending of the charging by the user terminal receiving, from the charging device, information indicating the ending of the charging, and
   wherein the user terminal is configured to transmit the information indicating the ending of the charging, received by the user terminal from the charging device, to the server, and
   wherein the server is configured to implement settlement processing of the charging based on receiving the information from the user terminal.

2. The charging authentication system according to claim 1, wherein
   the user terminal transmits a charging end command for the charging device, and
   when the charging end command is transmitted from the user terminal, the charging control device controls the charging device to end charging.

3. The charging authentication system according to claim 2, wherein
   the charging control device includes an outlet into which a charging cable is inserted, a locking mechanism that locks the charging cable inserted into the outlet, and a lock control unit that controls the locking mechanism to lock the charging cable at the start of charging and to release the lock of the charging cable at the end of charging.

4. The charging authentication system according to claim 2, wherein
   the charging control device transmits charging start information at the start of charging and transmits charging end information at the end of charging, and
   the server is further included that calculates a fee according to a charging time obtained from the charging start information and the charging end information transmitted from the charging control device, and charges the fee.

5. The charging authentication system according to claim 4, wherein
   the server obtains vacancy information of the charging device based on the charging end information and the charging start information, and provides the vacancy information of the charging device to the user terminal.

6. The charging authentication system according to claim 1, wherein
   the charging control device is detachably attached to the charging device.

7. A charging control device comprising:
   a plug that is insertable into an outlet provided in a charging device for an electric vehicle;
   an outlet that outputs charging power of the charging device supplied from the plug; and
   a charging control unit, implemented by a processor, configured to perform, as part of a charging authentication method, wireless communication with a user terminal owned by a user who desires to use the charging device, and to output the charging power from the outlet when authentication of the user terminal succeeds based on an authentication key that is provided to the user terminal in response to the user terminal reserving the charging device, wherein the charging authentication method further comprises:
   a server providing the authentication key to the user terminal;
   the user terminal is being instructed to discard the authentication key in response to an ending of the charging by the user terminal receiving, from the charging device, information indicating the ending of the charging;
   the user terminal transmitting the information indicating the ending of the charging, received by the user terminal from the charging device, to the server; and
   the server implementing settlement processing of the charging based on receiving the information from the user terminal.

8. A charging authentication method comprising:
   a step of transmitting, by a user terminal owned by a user who desires to use a charging device for an electric vehicle, a charging start command for the charging device;
   a step of authenticating, by an authentication unit implemented by a processor, the user terminal, that transmits the charging start command, based on an authentication key that is provided to the user terminal in response to the user terminal reserving the charging device; and
   a step of controlling, by a charging control device connected to the charging device, the charging device to start charging when authentication by the authentication unit succeeds, wherein the charging authentication method further comprises
   a server providing the authentication key to the user terminal;
   the user terminal is being instructed to discard the authentication key in response to an ending of the charging by the user terminal receiving, from the charging device, information indicating the ending of the charging;
   the user terminal transmitting the information indicating the ending of the charging, received by the user terminal from the charging device, to the server; and
   the server implementing settlement processing of the charging based on receiving the information from the user terminal.

9. The charging authentication method according to claim 8, further comprising:
a step of connecting the charging device and the electric vehicle by the user using a charging cable before the user terminal transmits the charging start command.

10. A charging authentication method comprising:
a step of distributing, to an owner of a charging device, a charging control device that is detachably attached to the charging device and that controls the charging device to start charging only when authentication of a user succeeds; and
a step of transmitting, by a user terminal owned by the user who desires to use the charging device, a charging start command, for the charging device, and an authentication key that is provided to the user terminal in response to the user terminal reserving the charging device, wherein the charging authentication method further comprises
a server providing the authentication key to the user terminal;
the user terminal is being instructed to discard the authentication key in response to an ending of the charging by the user terminal receiving, from the charging device, information indicating the ending of the charging;
the user terminal transmitting the information indicating the ending of the charging, received by the user terminal from the charging device, to the server; and
the server implementing settlement processing of the charging based on receiving the information from the user terminal.

* * * * *